United States Patent

Rioux

(10) Patent No.: US 9,322,415 B2
(45) Date of Patent: Apr. 26, 2016

(54) BLAST SHIELD FOR HIGH PRESSURE COMPRESSOR

(71) Applicant: United Technologies Corporation, Hartford, CT (US)

(72) Inventor: Philip Robert Rioux, North Berwick, ME (US)

(73) Assignee: United Technologies Corporation, Hartford, CT (US)

( * ) Notice: Subject to any disclaimer, the term of this patent is extended or adjusted under 35 U.S.C. 154(b) by 1042 days.

(21) Appl. No.: 13/662,900

(22) Filed: Oct. 29, 2012

(65) Prior Publication Data

US 2014/0140828 A1   May 22, 2014

(51) Int. Cl.
| | |
|---|---|
| F01D 11/18 | (2006.01) |
| F04D 29/58 | (2006.01) |
| F04D 19/02 | (2006.01) |
| F04D 29/54 | (2006.01) |
| F01D 25/24 | (2006.01) |

(52) U.S. Cl.
CPC ............ *F04D 29/5853* (2013.01); *F01D 11/18* (2013.01); *F01D 25/246* (2013.01); *F04D 19/02* (2013.01); *F04D 29/542* (2013.01); *F05D 2240/15* (2013.01)

(58) Field of Classification Search
None
See application file for complete search history.

(56) References Cited

U.S. PATENT DOCUMENTS

| | | | |
|---|---|---|---|
| 4,793,772 A | 12/1988 | Zaehring et al. | |
| 4,826,397 A * | 5/1989 | Shook | F01D 11/24 415/116 |
| 5,127,794 A * | 7/1992 | Burge | F01D 11/18 415/173.3 |
| 5,174,714 A | 12/1992 | Plemmons et al. | |
| 5,195,868 A | 3/1993 | Plemmons et al. | |
| 6,758,045 B2 | 7/2004 | Dimov et al. | |
| 7,596,949 B2 | 10/2009 | DeVane et al. | |
| 7,596,950 B2 | 10/2009 | Woltmann et al. | |
| 7,614,845 B2 | 11/2009 | Adam et al. | |
| 2002/0122716 A1 | 9/2002 | Beacock et al. | |
| 2002/0182058 A1 | 12/2002 | Darnell et al. | |
| 2004/0103668 A1 | 6/2004 | Bibler et al. | |
| 2005/0042080 A1 * | 2/2005 | Gendraud | F01D 11/24 415/173.1 |
| 2005/0091984 A1 | 5/2005 | Czachor | |
| 2006/0193721 A1 | 8/2006 | Adam et al. | |
| 2007/0140839 A1 | 6/2007 | Bucaro et al. | |
| 2007/0193273 A1 | 8/2007 | DeVane et al. | |
| 2007/0256418 A1 | 11/2007 | Mueller et al. | |

(Continued)

FOREIGN PATENT DOCUMENTS

GB    1225445    3/1971

OTHER PUBLICATIONS

International Search Report and Written Opinion for International Application No. PCT/US2013/063613 mailed on Jul. 7, 2014.

(Continued)

*Primary Examiner* — Christopher Verdier
*Assistant Examiner* — Justin Seabe
(74) *Attorney, Agent, or Firm* — Carlson, Gaskey & Olds, P.C.

(57) ABSTRACT

A high pressure compressor includes an inner case wall, a plurality of flanges extending outwardly from the inner case wall, a shield that surrounds at least a portion of at least one of the plurality of flanges to define a chamber that at least partially encases at least one of the plurality of flanges, and a passage at least partially defined by the shield that allows air to circulate into the chamber.

23 Claims, 3 Drawing Sheets

(56) References Cited

U.S. PATENT DOCUMENTS

| | | |
|---|---|---|
| 2008/0107522 A1 | 5/2008 | DiBendetto |
| 2008/0112797 A1* | 5/2008 | Seitzer .............. F01D 11/24 415/116 |
| 2008/0112798 A1 | 5/2008 | Seitzer et al. |
| 2008/0120841 A1 | 5/2008 | Ring et al. |
| 2009/0255261 A1 | 10/2009 | McMasters et al. |
| 2010/0071666 A1 | 3/2010 | Lee et al. |
| 2011/0206502 A1 | 8/2011 | Rulli et al. |
| 2011/0271684 A1 | 11/2011 | Corsmeier et al. |
| 2012/0177495 A1 | 7/2012 | Virkler et al. |

OTHER PUBLICATIONS

International Preliminary Report on Patentability for International Application No. PCT/US2013/063613 mailed on May 14, 2015.

European Search Report for EP Application No. 138655923 dated Oct. 9, 2015.

* cited by examiner

BLAST SHIELD FOR HIGH PRESSURE COMPRESSOR

BACKGROUND OF THE INVENTION

A heat shield provides thermal protection to flanges of a high pressure compressor of a gas turbine engine. The flanges are tightly sealed within the heat shield to prevent thermal transfer to the flanges and an inner case wall. Heat shields provide transient passive thermal control of the inner case and flanges. Complete sealing can cause high temperature gradients that could reduce the life of the components contained inside the heat shield and result in slow deflections of the components during thermal transients.

SUMMARY OF THE INVENTION

A high pressure compressor according to an exemplary embodiment of this disclosure, among other possible things includes an inner case wall, a plurality of flanges extending outwardly from the inner case wall, a shield that surrounds at least a portion of at least one of the plurality of flanges to define a chamber that at least partially encases at least one of the plurality of flanges, and a passage at least partially defined by the shield that allows air to circulate into the chamber.

In a further embodiment of any of the foregoing high pressure compressors, the plurality of flanges include a first flange structure on a forward side of the high pressure compressor and a second flange structure on an aft side of the high pressure compressor, and a seal that is located between the shield and the first flange structure.

In a further embodiment of any of the foregoing high pressure compressors the plurality of flanges include a first flange structure on a forward side of the high pressure compressor and a second flange structure on an aft side of the high pressure compressor. The shield includes an outer wall, a first wall substantially perpendicular to the outer wall on the forward side of the high pressure compressor, and a second wall substantially perpendicular to the outer wall on the aft side of the high pressure compressor.

In a further embodiment of any of the foregoing high pressure compressors, a gap is defined between the second wall and the inner case wall.

In a further embodiment of any of the foregoing high pressure compressors, the outer wall includes a plurality of holes that define the passage.

In a further embodiment of any of the foregoing high pressure compressors, the outer wall is located outwardly of an outer circumferential surface of the first flange structure and the second flange structure. The plurality of holes are located between the first flange structure and the second flange structure.

In a further embodiment of any of the foregoing high pressure compressors, the plurality of holes are each substantially oval in shape.

In a further embodiment of any of the foregoing high pressure compressors, the plurality of flanges include a first flange structure on a forward side of the high pressure compressor and a second flange structure on an aft side of the high pressure compressor, and the shield includes an outer wall, and a first wall substantially perpendicular to the outer wall on the forward side of the high pressure compressor.

In a further embodiment of any of the foregoing high pressure compressors, includes a seal between the first wall and the first flange structure.

In a further embodiment of any of the foregoing high pressure compressors, the outer wall is located outwardly of an outer circumferential surface of the first flange structure, and an outer circumferential surface of the second flange structure is uncovered by the outer wall to define the passage.

In a further embodiment of any of the foregoing high pressure compressors, includes a plurality of rotors and a plurality of stators. The inner case wall circumferentially surrounds the plurality of rotors and the plurality of stators.

In a further embodiment of any of the foregoing high pressure compressors, the plurality of flanges extend radially from the inner case wall.

In a further embodiment of any of the foregoing high pressure compressors, the shield is circumferential in shape.

A high pressure compressor according to an exemplary embodiment of this disclosure, among other possible things includes an inner case wall, and a plurality of flanges extending radially from the inner case wall. The plurality of flanges include a first flange structure on a forward side of the high pressure compressor and a second flange structure on an aft side of the high pressure compressor. A shield that surrounds at least a portion of at least one of the plurality of flanges defines a chamber that at least partially encases the at least one of the plurality of flanges. The shield includes an outer wall and a first wall substantially perpendicular to the outer wall on a forward side of the high pressure compressor, and the shield is circumferential in shape. A seal is located between the shield and the first flange structure and a passage at least partially defined by the shield that allows air to circulate into the chamber.

In a further embodiment of any of the foregoing high pressure compressors, the shield includes a second wall substantially perpendicular to the outer wall.

In a further embodiment of any of the foregoing high pressure compressors, a gap is defined between the second wall and the inner case wall on the aft side of the high pressure compressor.

In a further embodiment of any of the foregoing high pressure compressors, the outer wall includes a plurality of holes that define the passage.

In a further embodiment of any of the foregoing high pressure compressors, the outer wall is located outwardly of an outer circumferential surface of the first flange structure and the second flange structure, and the plurality of holes are located between the first flange structure and the second flange structure.

In a further embodiment of any of the foregoing high pressure compressors, the outer wall is located outwardly of an outer circumferential surface of the first flange structure, and an outer circumferential surface of the second flange structure is uncovered by the outer wall to define the passage.

In a further embodiment of any of the foregoing high pressure compressors, includes a plurality of rotors and a plurality of stators. The inner case wall circumferentially surrounds the plurality of rotors and the plurality of stators.

These and other features of the present invention can be best understood from the following specification and drawings, the following of which is a brief description.

DETAILED DESCRIPTION OF THE PREFERRED EMBODIMENTS

Figure 1:
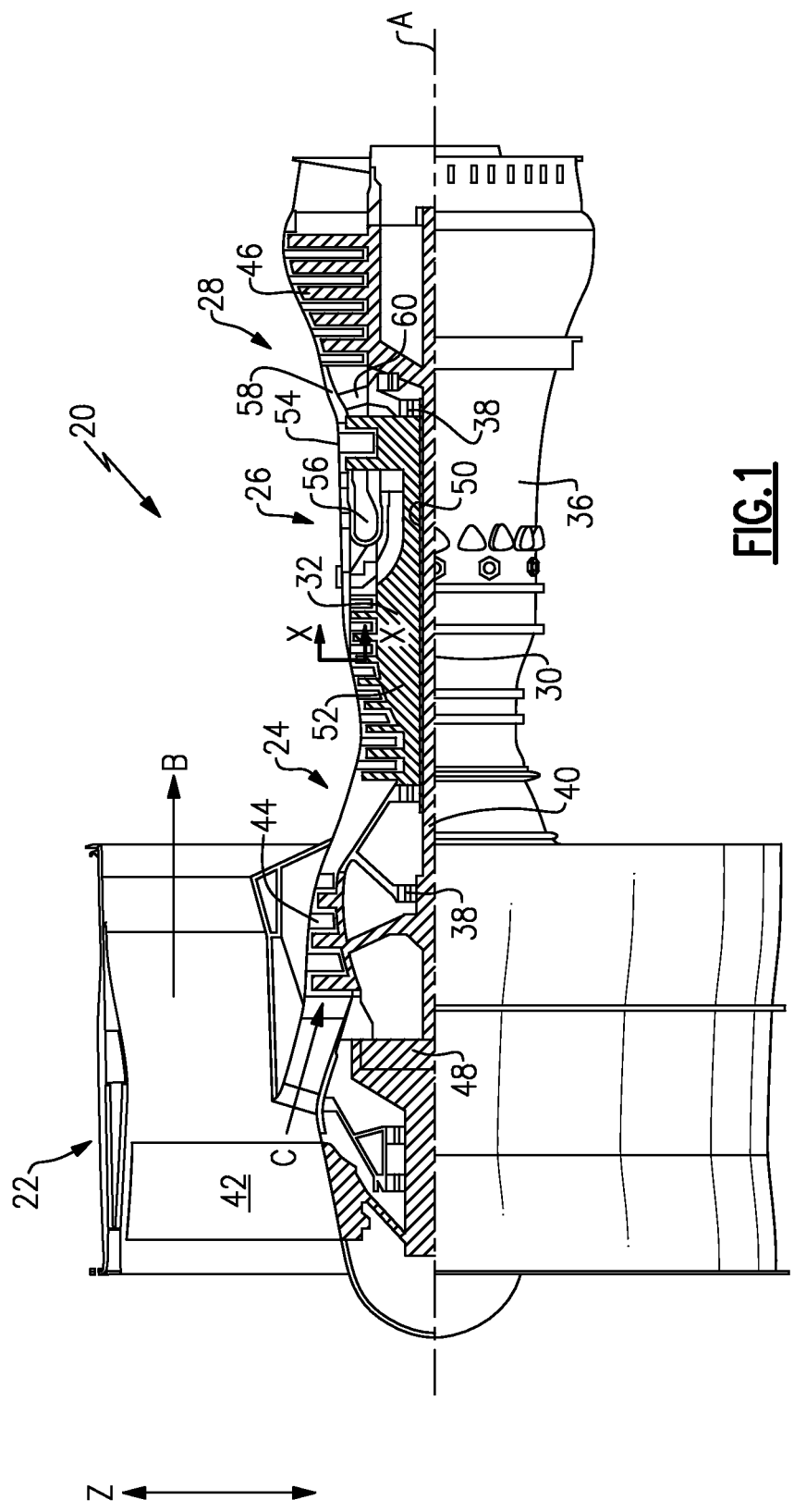
FIG. 1 illustrates a schematic view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features.

Although depicted as a turbofan gas turbine engine in the disclosed non-limiting embodiment, it should be understood that the concepts described herein are not limited to use with turbofans as the teachings may be applied to other types of turbine engines including three-spool or geared turbofan architectures.

The fan section 22 drives air along a bypass flowpath B while the compressor section 24 drives air along a core flowpath C for compression and communication into the combustor section 26 then expansion through the turbine section 28.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and a high pressure turbine 54.

A combustor 56 is arranged between the high pressure compressor 52 and the high pressure turbine 54.

A mid-turbine frame 58 of the engine static structure 36 is arranged generally between the high pressure turbine 54 and the low pressure turbine 46. The mid-turbine frame 58 further supports bearing systems 38 in the turbine section 28.

The inner shaft 40 and the outer shaft 50 are concentric and rotate via bearing systems 38 about the engine central longitudinal axis A, which is co-linear with their longitudinal axes.

The core airflow C is compressed by the low pressure compressor 44, then the high pressure compressor 52, mixed and burned with fuel in the combustor 56, then expanded over the high pressure turbine 54 and low pressure turbine 46. The mid-turbine frame 58 includes airfoils 60 which are in the core airflow path. The turbines 46, 54 rotationally drive the respective low speed spool 30 and high speed spool 32 in response to the expansion.

The gas turbine engine 20 is in one example a high-bypass geared aircraft engine. In a further example, the gas turbine engine 20 bypass ratio is greater than about six (6:1) with an example embodiment being greater than ten (10:1). The geared architecture 48 is an epicyclic gear train (such as a planetary gear system or other gear system) with a gear reduction ratio of greater than about 2.3 (2.3:1). The low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46.

In one disclosed embodiment, the gas turbine engine 20 bypass ratio is greater than about ten (10:1), and the fan diameter is significantly larger than that of the low pressure compressor 44. The low pressure turbine 46 has a pressure ratio that is greater than about five (5:1). The geared architecture 48 may be an epicycle gear train, such as a planetary gear system or other gear system, with a gear reduction ratio of greater than about 2.5 (2.5:1). It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet. The flight condition of 0.8 Mach and 35,000 feet, with the engine at its best fuel consumption, also known as bucket cruise Thrust Specific Fuel Consumption ("TSFC"). TSFC is the industry standard parameter of lbm of fuel being burned divided by lbf of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.45.

"Low corrected fan tip speed" is the actual fan tip speed in feet per second divided by an industry standard temperature correction of $[(Tram\ °R)/518.7)^{0.5}]$. The "Low corrected fan tip speed" as disclosed herein according to one non-limiting embodiment is less than about 1150 feet per second (351 meters per second).

Figure 2:
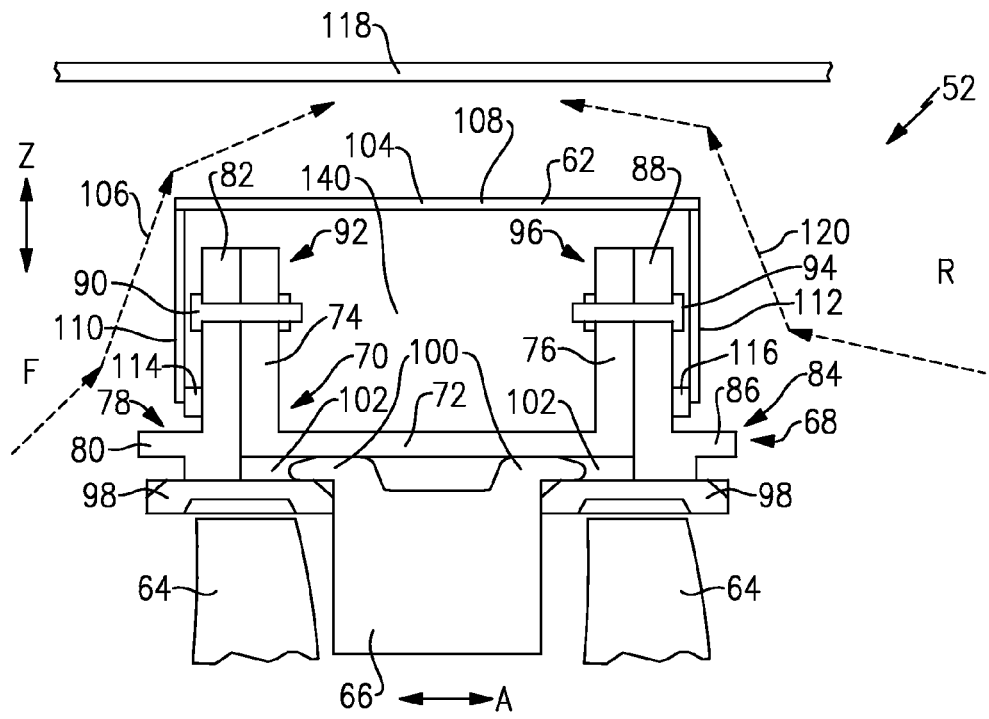
FIG. 2 illustrates a cross sectional view of a prior art heat shield of a high pressure compressor of the gas turbine engine of FIG. 1 taken along line X-X.

FIG. 2 illustrates a cross-sectional view of a portion of the high pressure compressor 52 including a prior art heat shield 104. The high pressure compressor 52 includes a plurality of alternating blades 64 that rotate about the longitudinal axis A and a plurality of static vanes 66, although only one vane 66 and two blades 64 are shown in FIG. 2.

The high pressure compressor 52 includes an inner case wall 68 that extends around circumferential the longitudinal axis A. The section of the inner case wall 68 shown in FIG. 2 includes three portions 70, 78 and 84. A first portion 70 of the inner case wall 62 include a first base portion 72, a first radially extending flange 74, and a second radially extending flange 76. The first flange 74 and the second flange 76 extend substantially perpendicularly to the first portion 70 of the inner case wall 68. A second portion 78 of the inner case wall 68 includes a second base portion 80, and a third radially extending flange 82 that extends substantially perpendicular to the second base portion 80. A third portion 84 of the inner case wall 68 includes a third base portion 86 and a fourth radially extending flange 88 that extends substantially perpendicularly to the third base portion 86.

The first flange 74 and the third flange 82 are secured together by at least one first fastener 90 to define a first flange structure 92, and the second flange 76 and the fourth flange 88 are secured together by at least one second fastener 94 to define a second flange structure 96. The flange structures 92 and 96 extend radially from the inner case wall 68. When fastened, the first base portion 72, the second base portion 80, and the third base portion 86 together define the inner case wall 68. Although only the first flange structure 92 and the second flange structure 96 are shown, the high pressure compressor 52 includes a plurality of flange structures 92 and 96 that extend radially about the longitudinal axis A. The first flange structure 92 and the second flange structure 96 are located within a chamber 140 defined by the heat shield 104.

An outer air seal 98 is located inwardly of the inner case wall 68. One blade 64 is located inwardly of each of the outer air seals 98. A portion 100 of the vane 66 is secured in a space 102 between the inner case wall 68 and one of the outer air seals 98.

A circumferential heat shield 104 is located outwardly of the flange structures 92 and 96. In one example, the heat shield 104 is substantially c-shaped. The heat shield 104 includes a circumferential outer wall 108, a circumferential first wall 110 that extends substantially perpendicularly to the outer wall 108 on a forward side F of the high pressure compressor 52, and a second wall 112 that extends substantially perpendicular to the outer wall 108 on the aft side R of the high pressure compressor 52. A first seal 114 is located between the first wall 110 and the first flange structure 92 on a forward side F of the high pressure compressor 52, and a second seal 116 is located between the second wall 112 and the second flange structure 96 on the aft side R of the high pressure compressor 52. The first seal 114 and the second seal 116 are circumferential in shape. A circumferential outer case wall 118 is located outwardly of the heat shield 104.

The heat shield 104 provides thermal protection to the flange structures 92 and 98. Hot bleed air 106 and aft hub air 120 flow over the heat shield 104. As the heat shield 104 of the prior art is tightly sealed, the heat shield 104 prevents thermal transfer to the inner case wall 68 and the flange structures 92 and 96, providing for passive thermal control of the flanges 92 and 96 through the transients. However, the sealing provided by the first seal 114 and the second seal 116 can result in high temperature gradients that can reduce the life of the components located inside the heat shield 104 and can also slow case deflections during thermal transients.

Figure 3:
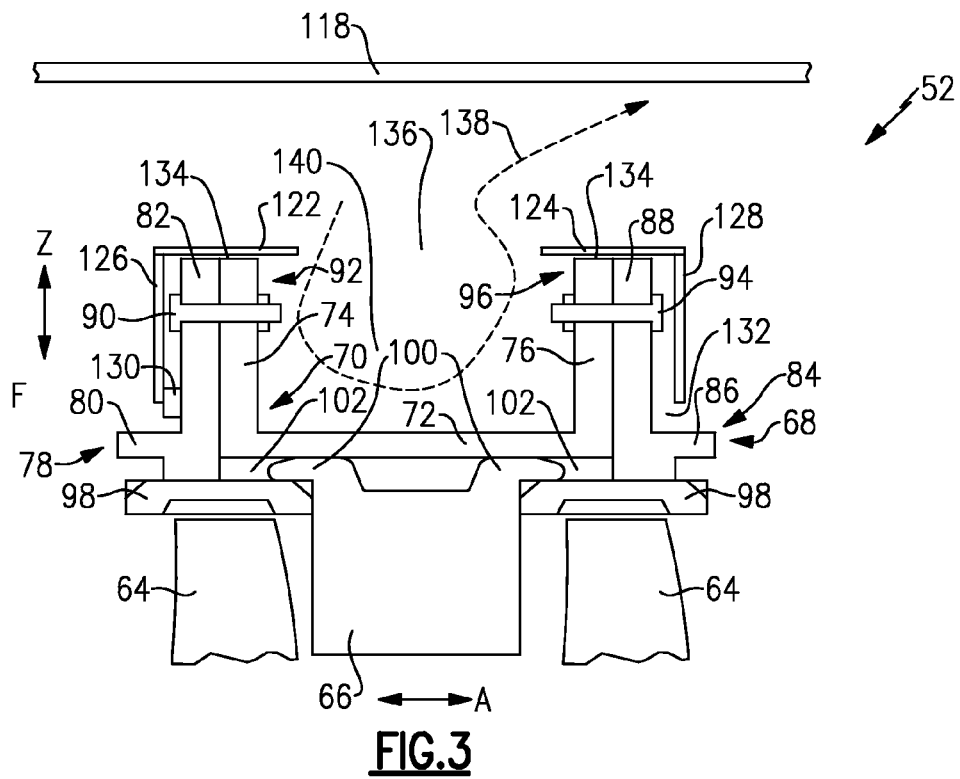
FIG. 3 illustrates a cross sectional view of a first example blast shield of the high pressure compressor of the gas turbine engine of FIG. 1 taken along line X-X.

FIG. 3 illustrates a first example of a blast shield 122. The blast shield 122 is employed with a high pressure compressor 52 that includes all the features previously about with respect to FIG. 2.

The blast shield 122 is circumferential in shape and extends around the longitudinal axis A. The blast shield 122 protects the flange structures 92 and 96 from the hot bleed air 106 and the aft hub air 120. The blast shield 122 includes a circumferential outer wall 124, a circumferential first wall 126 substantially perpendicular to the circumferential outer wall 124 on the forward side F of the high pressure compressor 52, and a circumferential second wall 128 substantially perpendicular to the circumferential outer wall 124 on the aft side R (FIG. 5) of the high pressure compressor 52. The circumferential outer wall 124 is connected to the circumferential first wall 126, and the circumferential outer wall 124 is connected to the circumferential second wall 128. The blast shield 122 is substantially C-shaped.

A seal 130 is located between the first wall 126 and the first flange structure 92. The seal 130 provides a tight seal at impingement locations of high temperature air flow at excessive speeds. In one example, the seal 130 is located on the forward side F of the high pressure compressor 52. In one example, there is no seal located between the second flange structure 96 and the second wall 128, creating a gap 132. The blast shield 122 covers sides and an outer circumferential surface 134 of the flanges 74, 76, 82 and 88.

Figure 4:
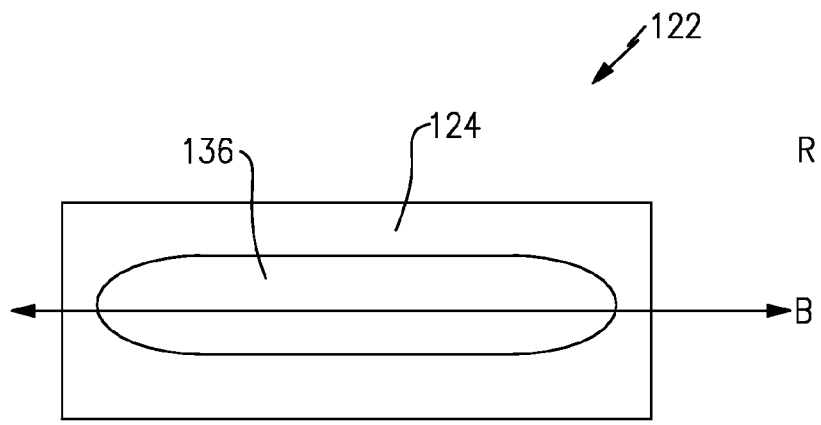
FIG. 4 illustrates a top view of the blast shield of FIG. 3.

As further shown in FIG. 4, the circumferential outer wall 124 includes a plurality of recirculation holes 136 that provide a passage. In one example, the recirculation holes 136 are substantially oval in shape, and a longitudinal axis B of the recirculation holes 136 extends between the first flange structure 92 and the second flange structure 96. The recirculation holes 136 can be sized and located to provide custom thermal control of the flange structures 92 and 96 and a desired amount of recirculation to provide more expansion and less rub during transients, improving running clearances between the rotating blades 64 and the outer air seals 98.

The heat shield 104 provides impingement protection to the flange structures 92 and 96, but does not completely seal the flange structures 92 and 96 from the surrounding air conditions. The hot bleed air 106 generates some recirculation air 138 that flows through the recirculation holes 136 and into a chamber 140 defined by the heat shield 104 to provide even heat load, reducing any thermal gradient issues, while speeding up the cases and increasing the expansion of the flanges 74, 76, 82 and 88.

Figure 5:
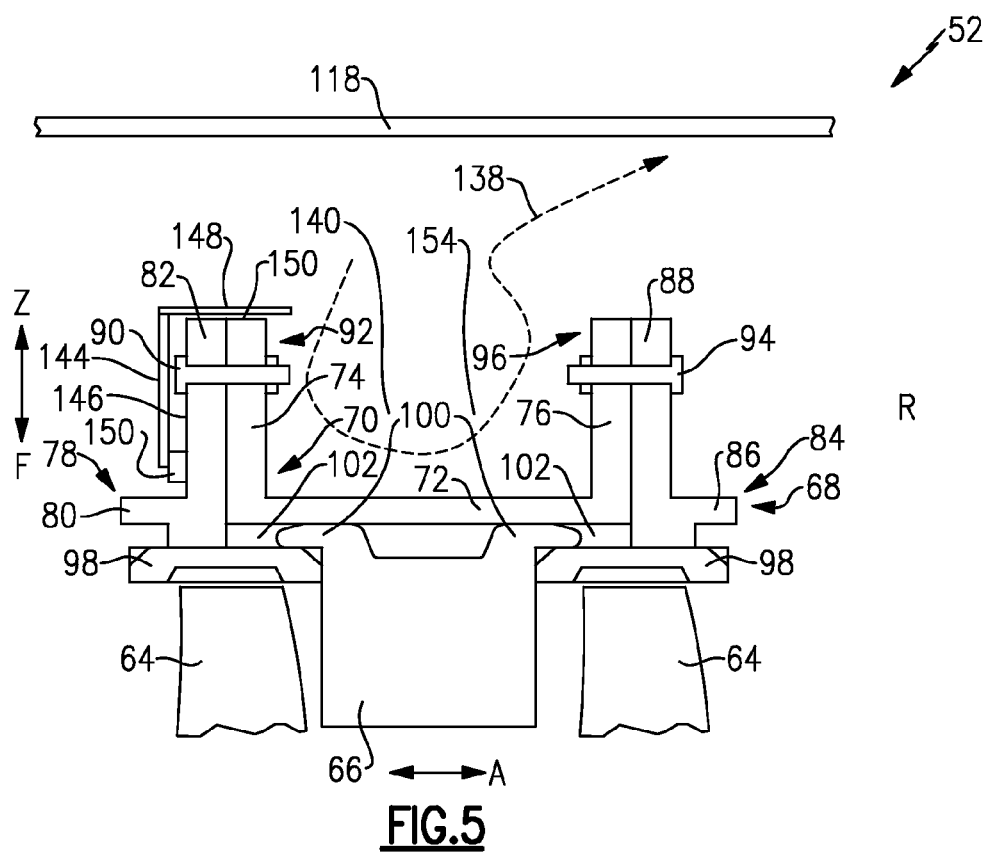
FIG. 5 illustrates a cross sectional view of a second example blast shield of the high pressure compressor of the gas turbine engine of FIG. 1 taken along line X-X.

FIG. 5 illustrates a second example of a blast shield 142. The blast shield 142 is employed with a high pressure compressor 52 that includes all the features previously about with respect to FIG. 2.

The blast shield 142 is circumferential in shape. The blast shield 142 protects the first flange structure 92 from the hot bleed air 106. The blast shield 142 includes a circumferential first wall 144 that covers a forward surface 146 of the first flange structure 92 and a circumferential outer wall 148 substantially perpendicular to the circumferential first wall 144 that covers an outer circumferential surface 150 of the first flange structure 92. The first wall 144 does not completely encase the chamber 140 or the second flange structures 96 on the aft side R of the high pressure compressor 52. That is, the blast shield 142 is located on the forward side F of the high pressure compressor 52, exposing the aft portions of the high pressure compressor 52. The blast shield 142 is substantially L-shaped.

However, in another example, the blast shield 142 can be located on the aft side H to protect the second flange structure 96 from the hot bleed air 106. In another example, the blast shield 142 can be located on both the front side F and the aft side R to protect both the first flange structure 92 and the second flange structure 96, respectively, from hot bleed air 106.

A seal 152 is located between the first wall 148 and the first flange structure 92 on the forward side F of the high pressure compressor 52. The seal 152 provides a tight seal at impingement locations of high temperature air flow at excessive speeds. In one example, the seal 130 is located on the forward side F of the high pressure compressor 52. The seal 152 is circumferential in shape.

Most of the chamber 140 and the second flange structure 96 on the aft side R of the high pressure compressor 52 are not covered by the heat shield 104 and are therefore exposed to define an opening 154 (or passage) through which the recirculation air 138 can flow in the chamber 140 to provide a more even heat load, reducing thermal gradient problems while speeding up the cases. The hot bleed air 106 generates some recirculation air 138 under the heat shield 104, and the flow can be customized to generate a desired amount of recirculation.

The blast shields 122 and 142 are smaller than the prior art heat shield 104. The blast shields 122 and 124 employ the first wall 126 and 144, respectively, to shield the flanges 74, 76, 82 and 88 from the hot bleed air 106 and to provide thermal control to the flanges 74, 76, 82 and 88 and the inner case wall 68. Additionally, the recirculation holes 136 of the blast shield 122 and the opening 154 of the blast shield 142 allow for the recirculation of the air 138 within the chamber 140 to reduce thermal gradients and expansion of the flanges 74, 76, 82 and 88. The blast shields 122 and 142 has also have a reduced weight as there is less material. The blast shields 122 and 142 provides for passive thermal control of the flanges 92 and 96 though thermal transients.

Low cycle fatigue life issues could also be enhanced because of the lower thermal gradients through the cycle. Lower thermal gradients also assist with the assembly of any snap fit components that are employed in the high pressure compressor 52 as the need to heat the parts prior to assembly can be reduced or eliminated. Additionally, if the number of snap fits can be reduced, tolerances could be increased to further aid in manufacturing.

Although a gas turbine engine 20 with geared architecture 48 is described, the blast shields 122 and 142 can be employed in a gas turbine engine without geared architecture.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A high pressure compressor comprising:
   an inner case wall;
   an outer case wall;
   a plurality of flanges extending outwardly from the inner case wall;
   a shield that surrounds at least a portion of at least one of the plurality of flanges to define a chamber that at least partially encases at least one of the plurality of flanges; and
   a passage at least partially defined by the shield that allows air to circulate from a space between the shield and the outer wall case, into the chamber, and back into the space.

2. The high pressure compressor as recited in claim 1 wherein the plurality of flanges include a first flange structure on a forward side of the high pressure compressor and a second flange structure on an aft side of the high pressure compressor, and a seal that is located between the shield and the first flange structure.

3. The high pressure compressor as recited in claim 1 wherein the plurality of flanges include a first flange structure on a forward side of the high pressure compressor and a second flange structure on an aft side of the high pressure compressor, and the shield includes an outer wall, a first wall substantially perpendicular to the outer wall on the forward side of the high pressure compressor, and a second wall substantially perpendicular to the outer wall on the aft side of the high pressure compressor.

4. The high pressure compressor as recited in claim 3 wherein a gap is defined between the second wall and the inner case wall.

5. The high pressure compressor as recited in claim 3 wherein the outer wall includes a plurality of holes that define the passage.

6. The high pressure compressor as recited in claim 5 wherein the outer wall is located outwardly of an outer circumferential surface of the first flange structure and the second flange structure, and the plurality of holes are located between the first flange structure and the second flange structure.

7. The high pressure compressor as recited in claim 6 wherein the plurality of holes are each substantially oval in shape.

8. The high pressure compressor as recited in claim 1 wherein the plurality of flanges include a first flange structure on a forward side of the high pressure compressor and a second flange structure on an aft side of the high pressure compressor, and the shield includes an outer wall, and a first wall substantially perpendicular to the outer wall on the forward side of the high pressure compressor.

9. The high pressure compressor as recited in claim 1 including a plurality of rotors and a plurality of stators, wherein the inner case wall circumferentially surrounds the plurality of rotors and the plurality of stators.

10. The high pressure compressor as recited in claim 1 wherein the plurality of flanges extend radially from the inner case wall.

11. The high pressure compressor as recited in claim 1 wherein the shield is circumferential in shape.

12. The high pressure compressor as recited in claim 1 wherein a gap between the shield and the second flange structure is sealless.

13. The high pressure compressor as recited in claim 6 wherein the plurality of holes have a longitudinal axis that extends between the first flange structure and the second flange structure.

14. The high pressure compressor as recited in claim 6 wherein all the plurality of holes are located between the first flange structure and the second flange structure.

15. A high pressure compressor comprising:
    an inner case wall;
    a plurality of flanges extending outwardly from the inner case wall, wherein the plurality of flanges include a first flange structure on a forward side of the high pressure compressor and a second flange structure on an aft side of the high pressure compressor;
    a shield that surrounds at least a portion of at least one of the plurality of flanges to define a chamber that at least partially encases at least one of the plurality of flanges, and the shield includes an outer wall and a first wall substantially perpendicular to the outer wall on the forward side of the high pressure compressor, wherein the outer wall is located outwardly of an outer circumferential surface of the first flange structure; and
    a passage at least partially defined by the shield that allows air to circulate into the chamber, and an outer circumferential surface of the second flange structure is uncovered by the outer wall to define the passage.

16. The high pressure compressor as recited in claim 15 including a seal located between the first wall and the first flange structure.

17. A high pressure compressor comprising:
    an inner case wall;
    an outer case wall;
    a plurality of flanges extending radially from the inner case wall, wherein the plurality of flanges include a first flange structure on a forward side of the high pressure compressor and a second flange structure on an aft side of the high pressure compressor;
    a shield that surrounds at least a portion of at least one of the plurality of flanges to define a chamber that at least partially encases the at least one of the plurality of flanges, wherein the shield includes an outer wall and a first wall substantially perpendicular to the outer wall on a forward side of the high pressure compressor, and the shield is circumferential in shape;
    a seal located between the shield and the first flange structure; and
    a passage at least partially defined by the shield that allows air to circulate from a space between the shield and the outer wall case, into the chamber, and back into the space.

18. The high pressure compressor as recited in claim 17 wherein the shield includes a second wall substantially perpendicular to the outer wall.

19. The high pressure compressor as recited in claim 18 wherein a gap is defined between the second wall and the inner case wall on the aft side of the high pressure compressor.

20. The high pressure compressor as recited in claim 18 wherein the outer wall includes a plurality of holes that define the passage.

21. The high pressure compressor as recited in claim 20 wherein the outer wall is located outwardly of an outer circumferential surface of the first flange structure and the second flange structure, and the plurality of holes are located between the first flange structure and the second flange structure.

22. The high pressure compressor as recited in claim 17 including a plurality of rotors and a plurality of stators, wherein the inner case wall circumferentially surrounds the plurality of rotors and the plurality of stators.

23. A high compressor comprising:
an inner case wall;
a plurality of flanges extending radially from the inner case wall, wherein the plurality of flanges include a first flange structure on a forward side of the high pressure compressor and a second flange structure on an aft side of the high pressure compressor;
a shield that surrounds at least a portion of at least one of the plurality of flanges to define a chamber that at least partially encases the at least one of the plurality of flanges, wherein the shield includes an outer wall and a first wall substantially perpendicular to the outer wall on a forward side of the high pressure compressor, and the shield is circumferential in shape, wherein the outer wall is located outwardly of an outer circumferential surface of the first flange structure; and
a seal located between the shield and the first flange structure; and
a passage at least partially defined by the shield that allows air to circulate into the chamber, and an outer circumferential surface of the second flange structure is uncovered by the outer wall to define the passage.

* * * * *